J. R. MONTAGUE.
CAMERA TRIPPING ATTACHMENT.
APPLICATION FILED JAN. 3, 1916.

1,208,617.

Patented Dec. 12, 1916.

WITNESSES
Frank C. Palmer
C. Bradway

INVENTOR
J. R. Montague
BY
ATTORNEYS

UNITED STATES PATENT OFFICE.

JOHN RUSSELL MONTAGUE, OF NIAGARA FALLS, ONTARIO, CANADA.

CAMERA TRIPPING ATTACHMENT.

1,208,617.	Specification of Letters Patent.	Patented Dec. 12, 1916.

Application filed January 3, 1916. Serial No. 69,915.

*To all whom it may concern:*

Be it known that I, JOHN RUSSELL MONTAGUE, a citizen of Canada, and a resident of Niagara Falls, in the county of Welland, in the Province of Ontario and Dominion of Canada, have invented a new and Improved Camera Tripping Attachment, of which the following is a full, clear, and exact description.

This invention relates to a camera tripping attachment and has for its object to provide a simple and compact device, which can be readily attached and detached from a camera and which will permit of the operator being included in the groups photographed.

A further object is to provide an adjustable tensioning device between the tripping mechanism and the exposure mechanism of the camera.

A still further object is the reduction in the number of parts of the tripping attachment whereby the tripping lever is released by a catch operated by a direct pull from the operator.

Other objects and advantages will be manifest from the description of an embodiment of my invention when taken in conjunction with the accompanying drawings.

Figure 1:
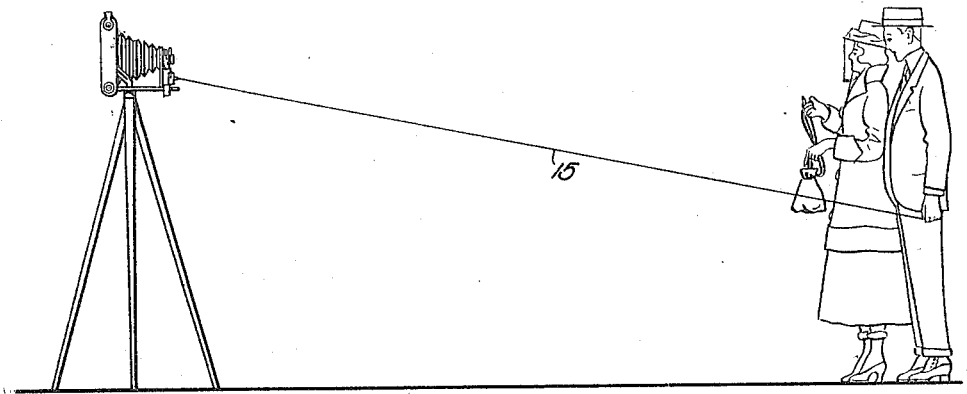
Figure 2:
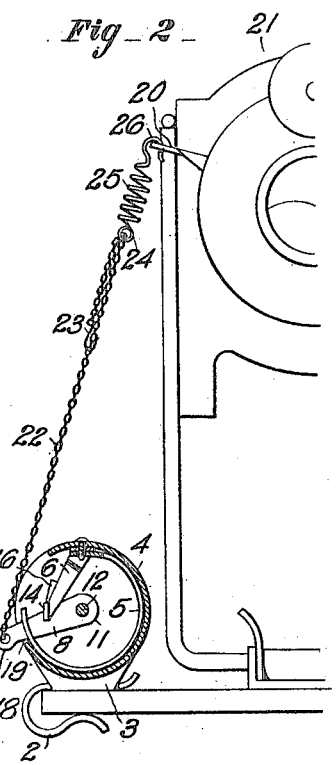
Figure 3:
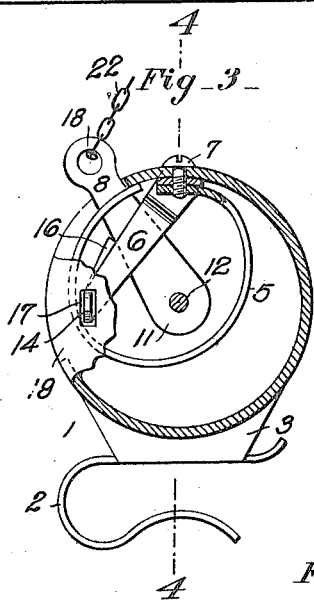
Figure 4:
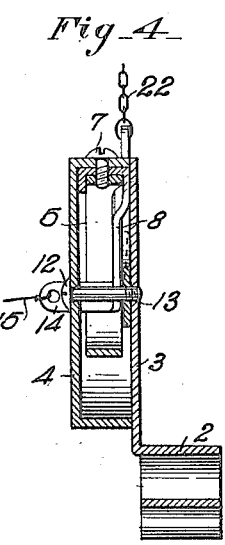
Figure 6:
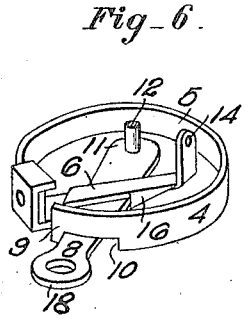
Figure 5:
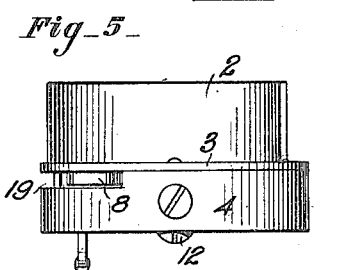

Figure 1 is a perspective view showing the manner of operation of the camera tripping attachment by the operator; Fig. 2 is an end view of the device with part of the mechanism in section; Fig. 3 is an enlarged sectional view of the tripping attachment proper; Fig. 4 is a sectional view taken at right angles to Fig. 3 on the line 4—4; Fig. 5 is a plan view of the device; and Fig. 6 is a view indicating the assembled arrangement of certain of the parts of the attachment.

The tripping attachment 1 comprises a clip member 2 with a base 3 formed at right angles to said clip. Mounted upon said base is a circular cover 4 to which is attached at a point farthest removed from the clip, a spring 5 and a catch release 6 by means of a screw 7. The circular spring 5 is attached at one end to the lever arm 8 by means of a hook portion 9 formed by a slot 10 and within which slot, the lever arm 8 is adapted to operate. The lever arm 8 is fulcrumed at 11 by means of a central stud 12, passing through the cover 4 and engaging with the base 3, by means of the threaded hole 13. The catch 6 which would ordinarily be made up of light spring metal, is attached at one end to the cover 4 by means of the screw 7. The other extremity constitutes an eye 14, to which would be attached a cord 15 for withdrawing the lock, a tooth 16 being bent at right angles to the flat portion of the catch 6 in order that said tooth may engage with the tripping lever arm 8. Thus, by the cord 15 withdrawing the catch 6 in a direction at right angles to the plane of movement of the tripping lever 8, the expanding spring 5 causes the tripping lever to rotate about the fulcrum point 11. The eye 14 of the catch normally passes through a hole 17 in the circular cover 4, whereas the eye 18 which forms an extension in the lever arm 8, passes through a slot 19 in said cover. Operating between the eye 18 and the exposure lever 20 of the exposure mechanism, is an adjustable chain 22, having a hook 23 at one end for shortening said chain, which chain passes through an eye 24 of a spring 25. The other end of said spring constitutes a hook 26 for engagement with the exposure lever 20 above referred to. In this manner, it will be seen that the tension between the tripping lever 8 and the exposure lever 20 can be adjusted in such a manner as to render the exposure lever inoperative without the additional tension of the spring 5 when released by the catch 6. This element of adjustability of the tension in the spring 5 constitutes one of the important features of my invention in so far as the requisite amount of pressure required to operate the exposure lever can be regulated to suit the condition of the spring restraining mechanism of the exposure lever. Thus with the exposure lever, which requires very little pressure to operate, the spring 25 can be put under very slight pressure in order that the shock of the much stiffer spring 5 may be taken up thereby, without unduly affecting the exposure mechanism. On the other hand, should a greater tension be required in the exposure lever, the necessary primary tension in the spring 25 can be set up by means of the hook 23 engaging different links of the connecting chain 22 and thereby allowing the stiffer spring 5 to operate with greater mechanical advantage on the exposure lever.

In the operation of the device, the tripping attachment is fastened to the base of the camera by means of the clip 2. Thereafter the connecting means constituting the adjustable chain 22 and the spring 25 is suitably tensioned with respect to the usual exposure lever of the camera. By means of the cord 15, which can be attached to the eye 14 of the catch 6, the operator standing in front of the camera, by exerting a uniform pressure upon the catch, releases the tripping lever 8 from its position indicated in Fig. 3, thereby operating the exposure lever of the camera, which phase of the operation is indicated in Fig. 2.

Having described an embodiment of my invention, what I claim is:

1. A tripping attachment for the exposure lever of a camera, comprising a tripping lever, a spring for actuating the tripping lever when released, means for releasing the tripping lever, and a connecting means including a spring leading from the said tripping lever and adapted for connection with the exposure lever for taking up any shock when the tripping lever is released.

2. A tripping attachment for cameras comprising a spring biased lever arm, a catch for locking said lever arm, said catch arranged and adapted to move out of the plane of movement of said lever arm to release the said arm, and means operable in the direction of the catch movement to disengage the catch from the lever arm.

3. In a tripping attachment for cameras, the combination with a spring actuated tripping means, of an adjustable connecting means including a spring, for taking up any shock when the tripping means is tripped.

4. A tripping attachment for cameras comprising a clip adapted to engage the base of a camera, a tripping lever means mounted on said clip and having a tripping lever adapted to move in a plane parallel to an exposure lever of the camera, a catch for locking said tripping lever mounted to move within the plane of the tripping lever movement, for releasing the latter lever, and means on the catch for attaching a cord to freely and directly pull the said catch away from the tripping lever.

5. In combination with a spring operated tripping means, an adjustable spring connecting means for connecting the tripping means with the exposure lever of a camera and serving to prevent shock from the spring action of the said tripping means.

6. In combination with a spring operated tripping means, an adjustable spring connecting means for connecting the tripping means with the exposure lever of a camera and preventing shock from the spring action of the said tripping means, said spring operated tripping means comprising a spring biased tripping lever and a catch to which a cord can be attached for moving said catch out of the way of the tripping lever freely and directly.

7. Adjustable means for placing the exposure lever of a camera under inoperative tension, and further means including a tripping lever spring operated for increasing said tension to operativeness when desired.

8. Adjustable means for placing the exposure lever of a camera under inoperative tension, a tripping lever means, a spring for increasing said tension to operativeness, a catch for holding the lever, and a release pull cord attached to the catch for releasing the same.

9. In combination, a spring operated tripping lever, adjustable tension means for placing the exposure lever of a camera under tension insufficient to operate the same, the adjustable tension means being connected with the said tripping lever, means for locking the tripping lever against the tension of its spring, the tension of the spring of the tripping lever being greater than the tension of the adjustable tension means, and means connected with the locking means for releasing the tripping lever to cause the tension of its spring to be exerted on the adjustable tension means.

In testimony whereof I have signed my name to this specification in the presence of two subscribing witnesses.

JOHN RUSSELL MONTAGUE.

Witnesses:
    JOHN B. HOPKINS,
    JOHN ROBERTS MONTAGUE.

Copies of this patent may be obtained for five cents each, by addressing the "Commissioner of Patents, Washington, D. C."